July 23, 1957 J. F. COURTNEY 2,800,328
PLURAL HORIZONTAL AXES ROUNDABOUT
Filed Sept. 8, 1954 8 Sheets-Sheet 1

INVENTOR.
JOHN F. COURTNEY
BY
ATTORNEY

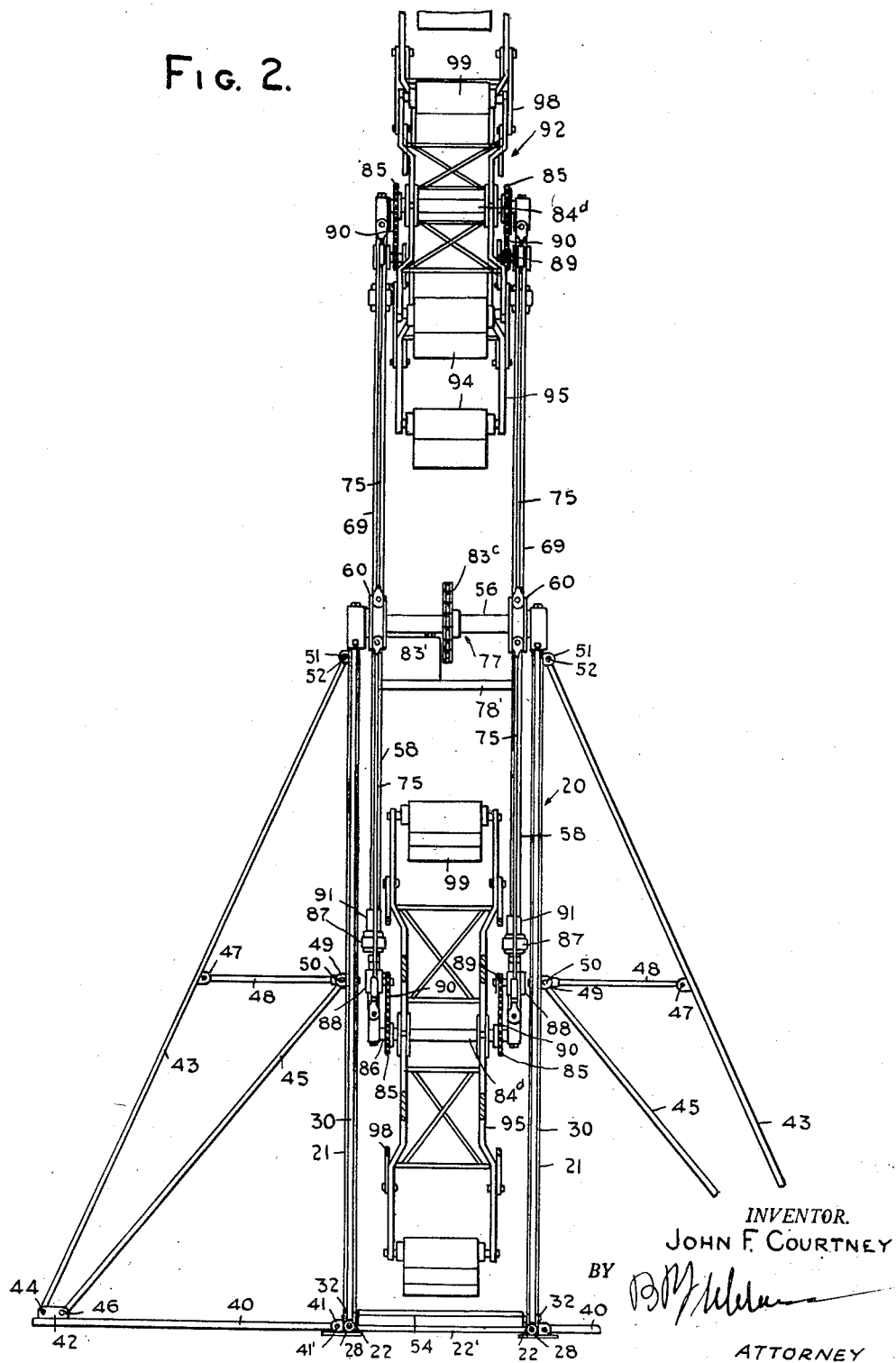

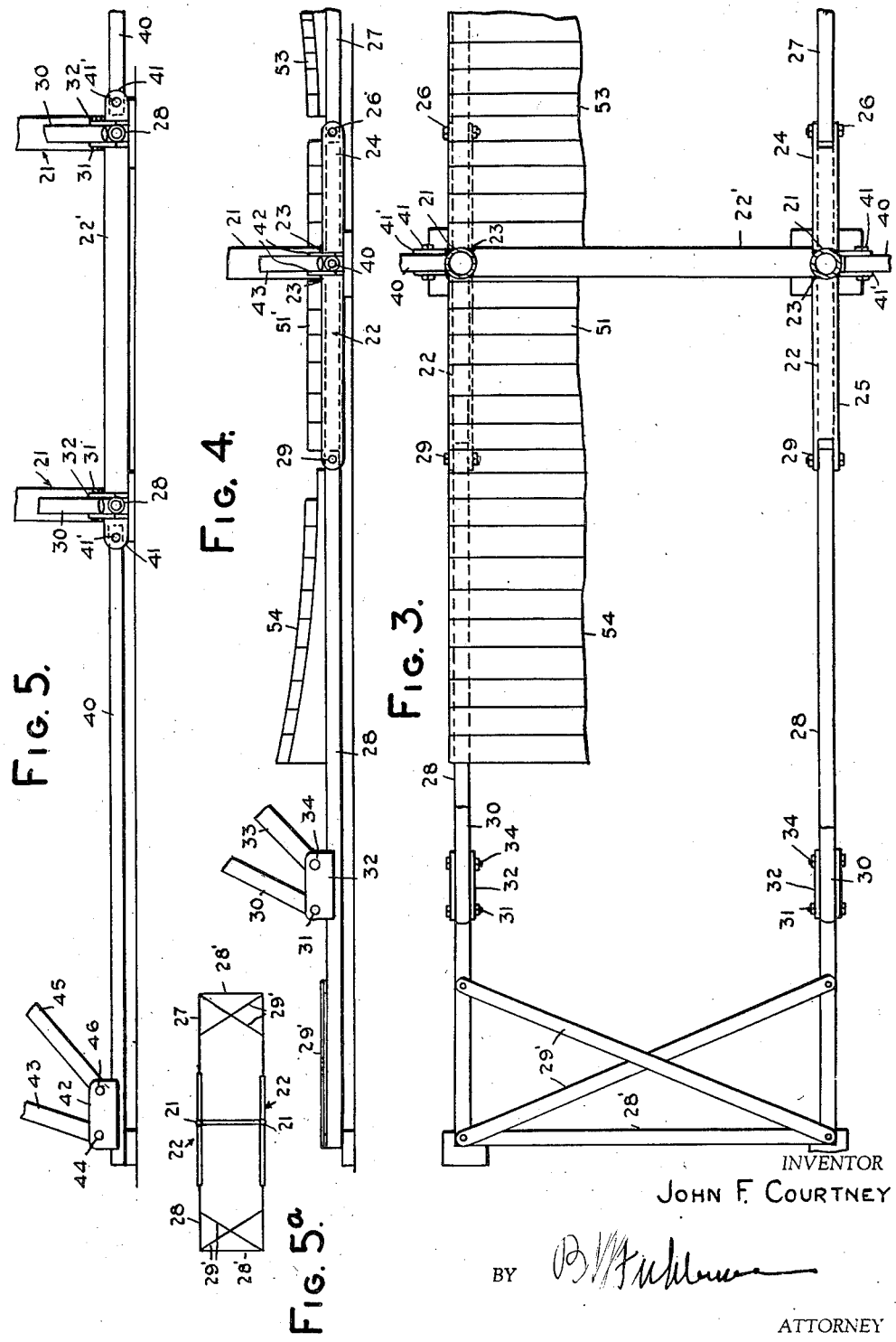

July 23, 1957   J. F. COURTNEY   2,800,328
PLURAL HORIZONTAL AXES ROUNDABOUT
Filed Sept. 8, 1954   8 Sheets-Sheet 4
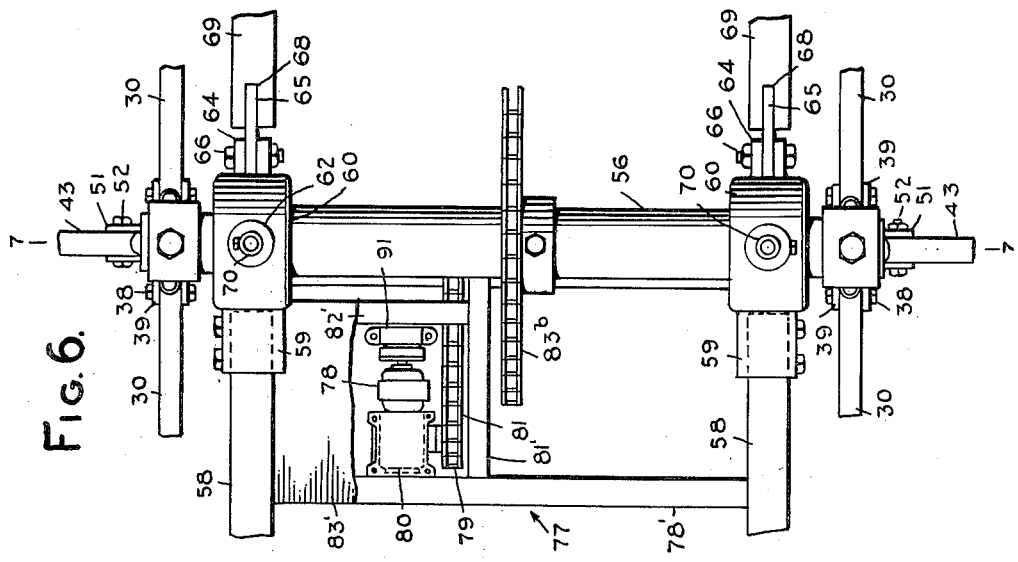
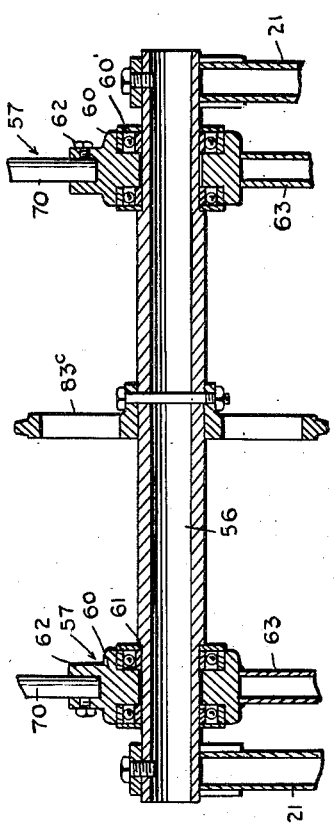
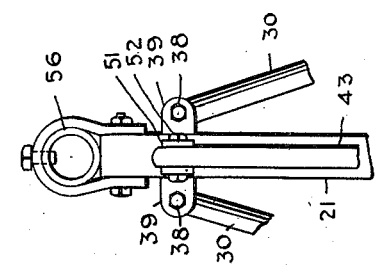
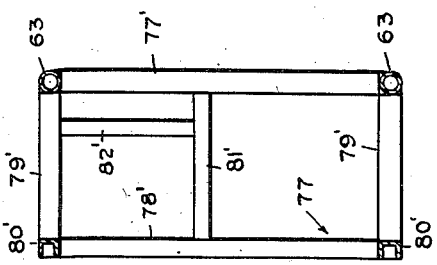
INVENTOR.
JOHN F. COURTNEY
BY
ATTORNEY July 23, 1957  J. F. COURTNEY  2,800,328
PLURAL HORIZONTAL AXES ROUNDABOUT
Filed Sept. 8, 1954  8 Sheets-Sheet 5

INVENTOR
JOHN F. COURTNEY
BY
ATTORNEY

July 23, 1957  J. F. COURTNEY  2,800,328
PLURAL HORIZONTAL AXES ROUNDABOUT
Filed Sept. 8, 1954  8 Sheets-Sheet 6
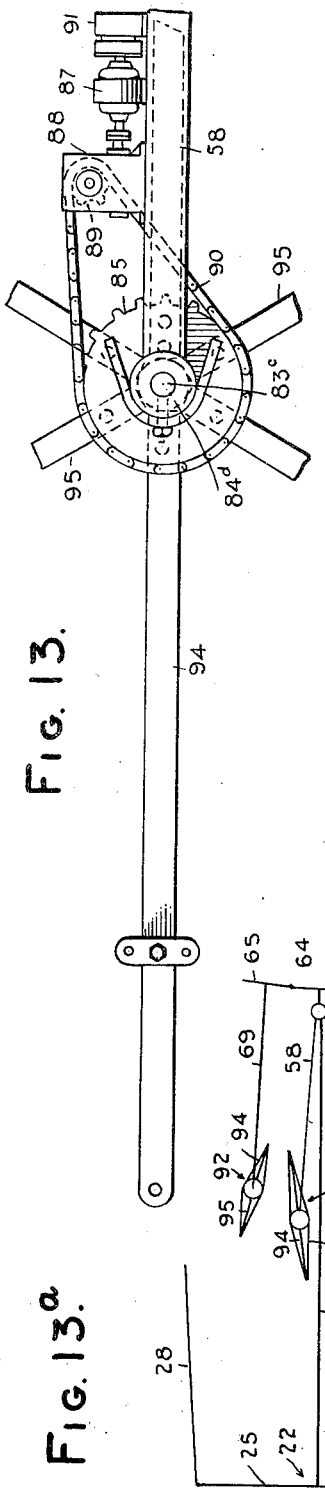
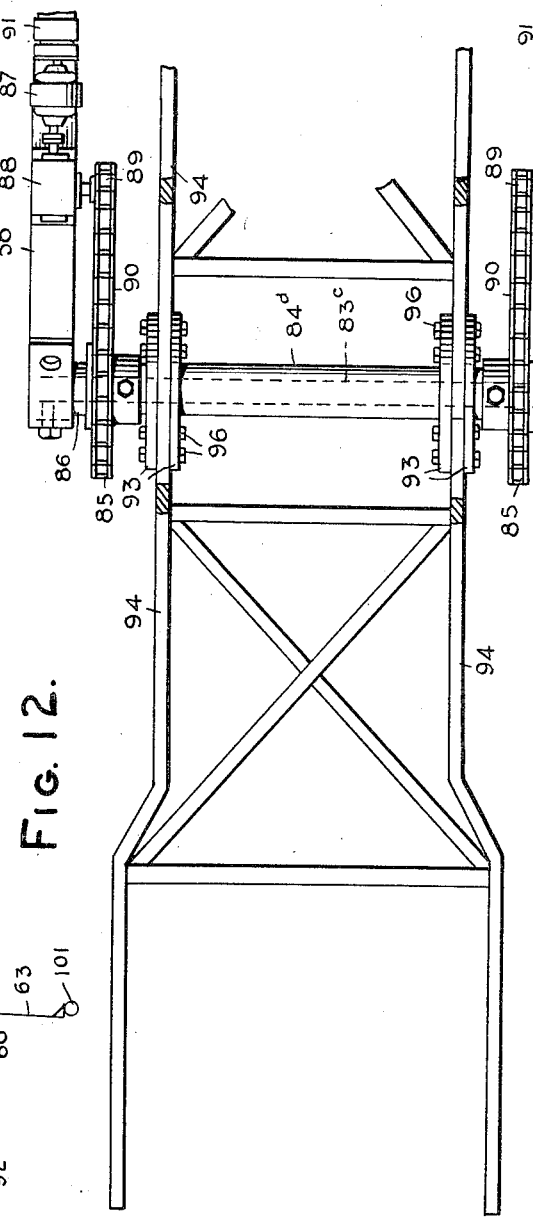
INVENTOR
JOHN F. COURTNEY
BY
ATTORNEY July 23, 1957    J. F. COURTNEY    2,800,328
PLURAL HORIZONTAL AXES ROUNDABOUT
Filed Sept. 8, 1954    8 Sheets-Sheet 7

INVENTOR
JOHN F. COURTNEY

BY

ATTORNEY

July 23, 1957 — J. F. COURTNEY — 2,800,328
PLURAL HORIZONTAL AXES ROUNDABOUT
Filed Sept. 8, 1954 — 8 Sheets-Sheet 8

INVENTOR
JOHN F. COURTNEY
BY
ATTORNEY

United States Patent Office 2,800,328
Patented July 23, 1957

2,800,328

PLURAL HORIZONTAL AXES ROUNDABOUT

John Fletcher Courtney, Tampa, Fla.

Application September 8, 1954, Serial No. 454,795

1 Claim. (Cl. 272—38)

My invention relates to amusement apparatus of the Ferris wheel type.

An important object of the invention is to provide an amusement apparatus of the above-mentioned character, the major parts of which are permanently connected and are foldable so that the apparatus may be collapsed for transportation.

A further object of the invention is to provide an apparatus of the above-mentioned character which may be folded or collapsed by a relatively few attendants, in a short time, considering the size of the apparatus, thus saving time and labor in the transportation of the apparatus.

A further object of the invention is to provide an apparatus of the above-mentioned character which is high and large, and yet may be readily collapsed for the purpose of shipment, so that it may be used at different locations of amusement.

Other objects and advantages of the invention will be apparent during the course of the following description.

Figure 1:
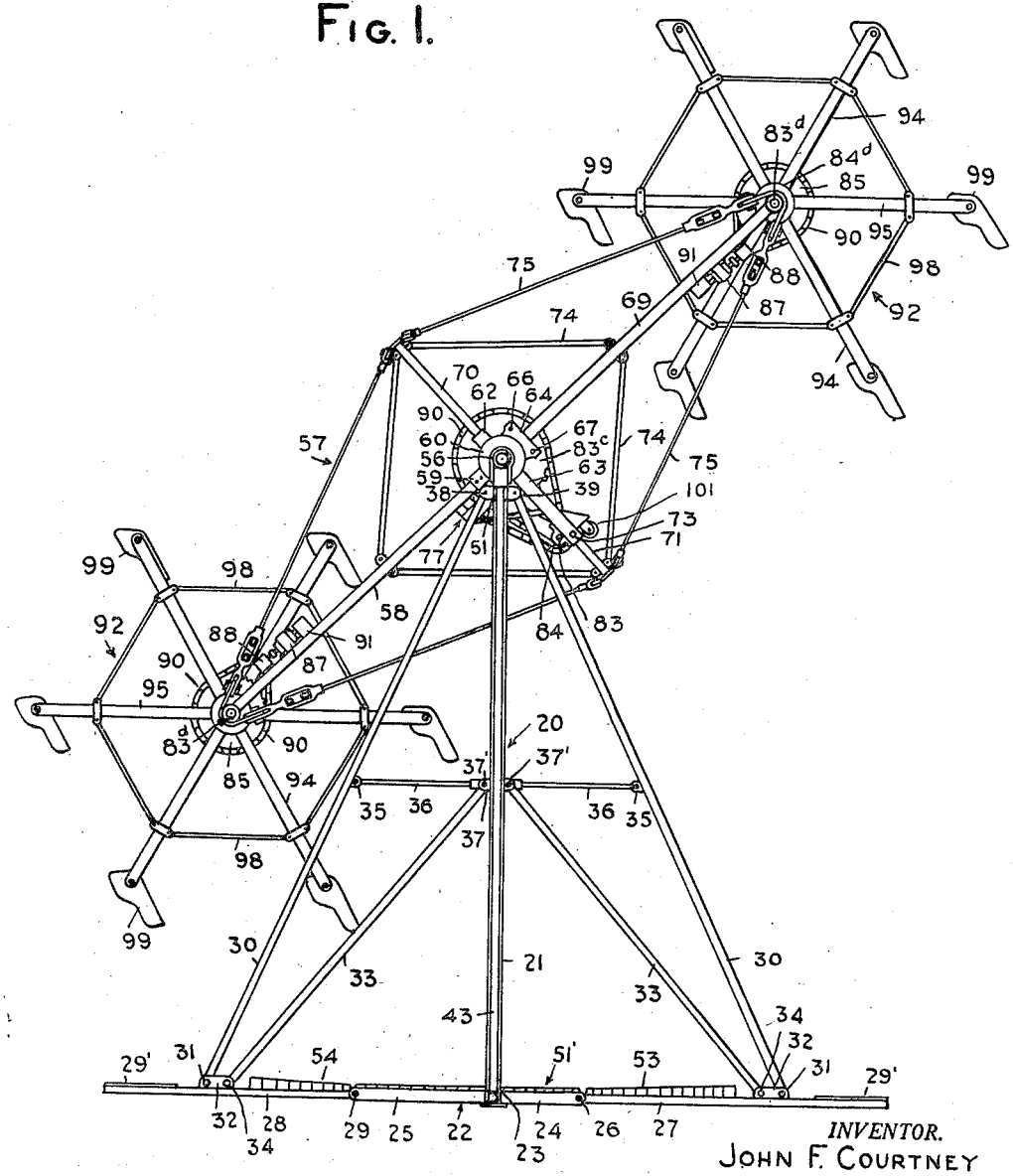
Figure 9:
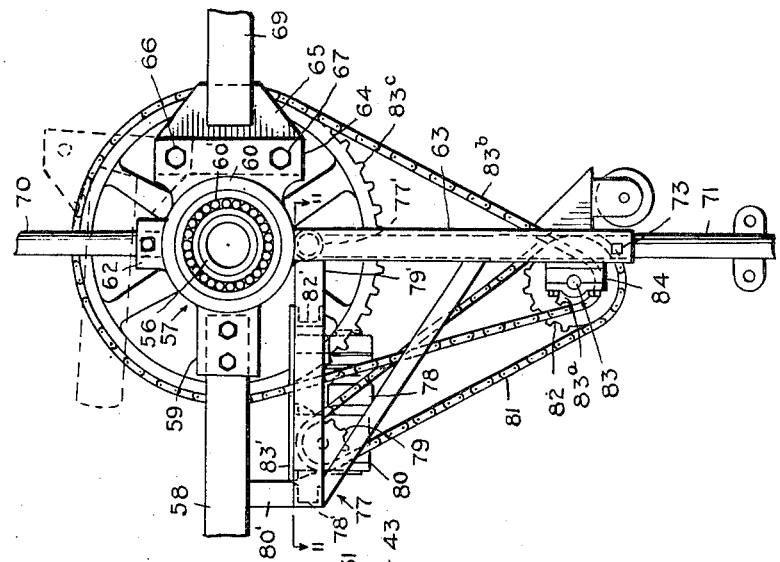
Figure 10:
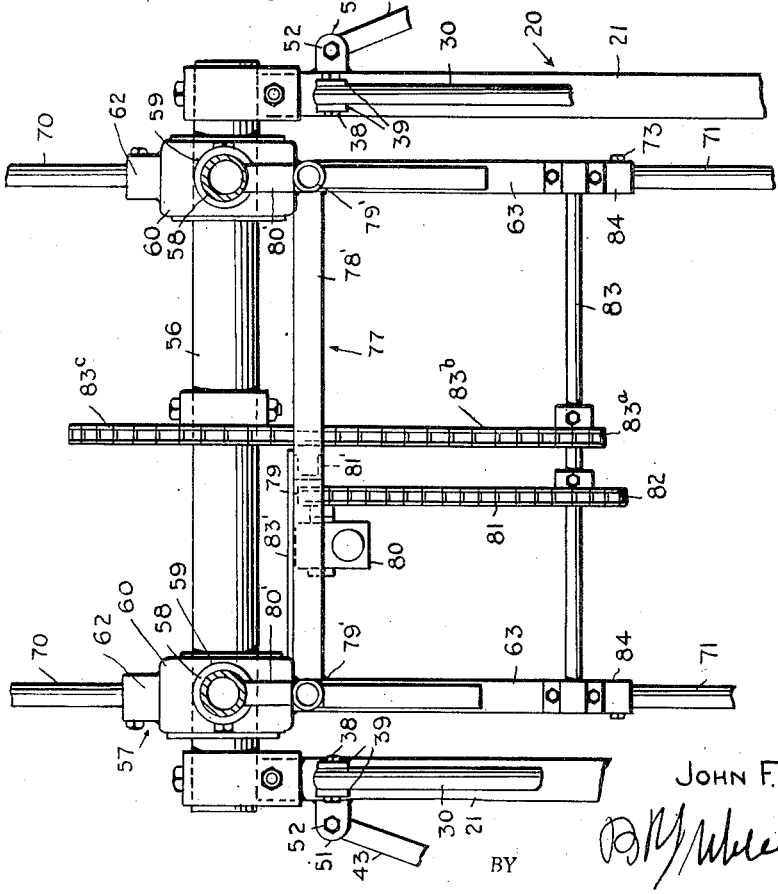
Figure 15:
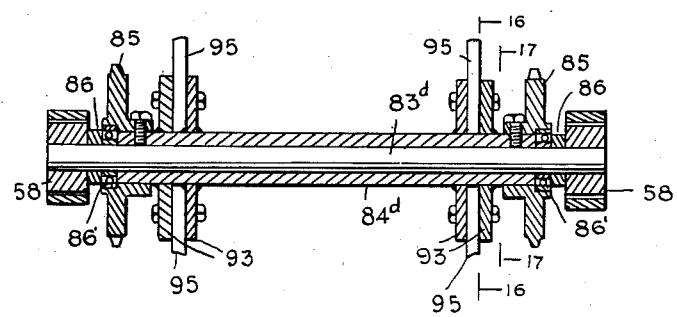
Figure 14:
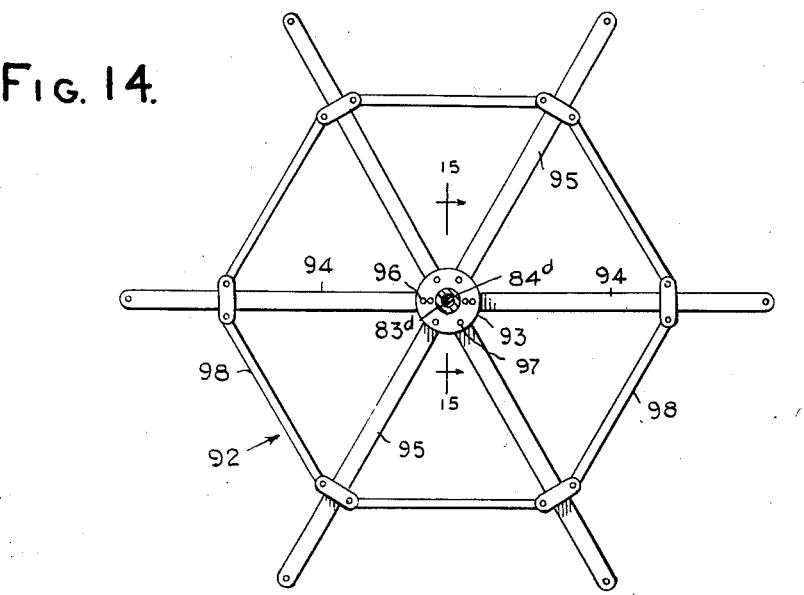
Figure 16:
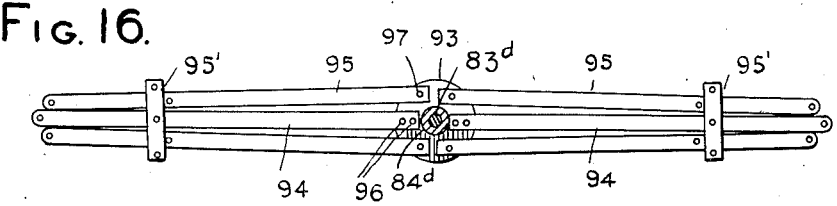
Figure 17:
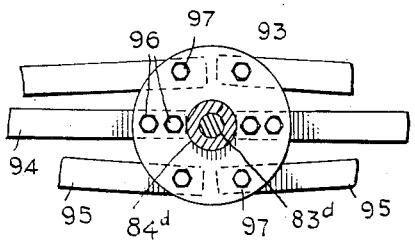
Figure 18:
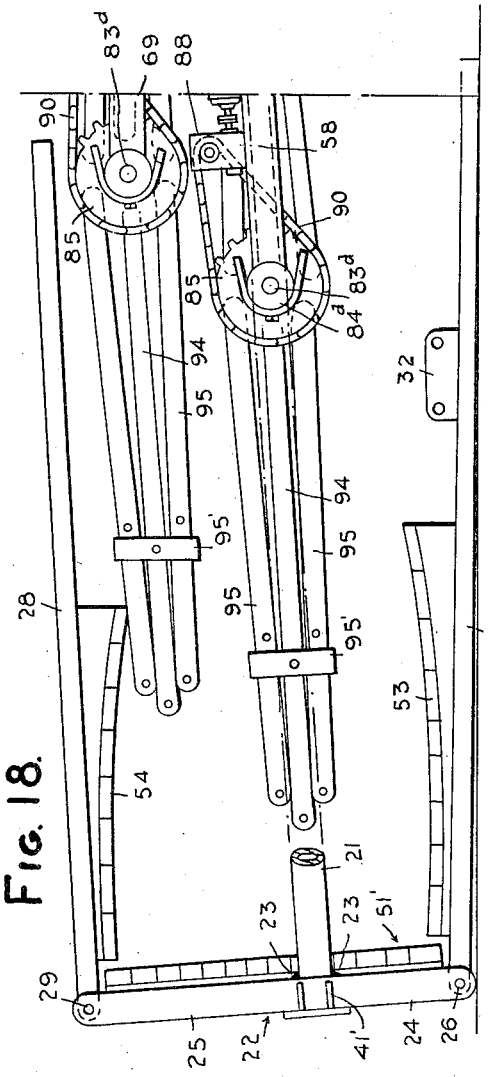
Figure 19:
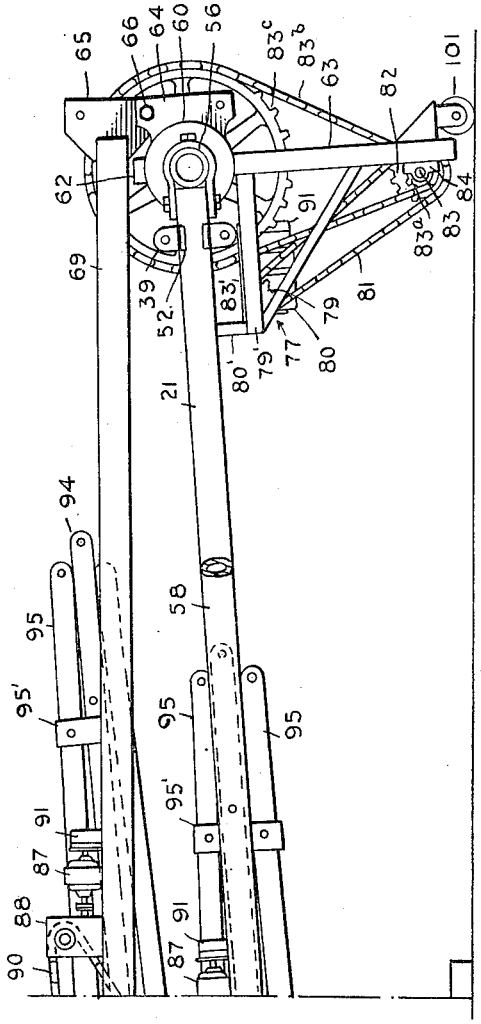

In the accompanying drawings forming a part of this application and in which like numerals are employed to designate like parts throughout the same, Figure 1 is a side elevation of apparatus embodying my invention, Figure 2 is an end elevation of the same, Figure 3 is a plan view of the base of the supporting tower, parts in section and parts broken away, Figure 4 is a side elevation of the base, Figure 5 is an end elevation of the base, Figure 5a is a diagrammatic plan view of the complete base, Figure 6 is a plan view of the top of the rotatable supporting element and associated elements, parts broken away, Figure 7 is a vertical section taken on line 7—7 of Figure 6, Figure 8 is a side elevation of the upper end of one supporting post and associated elements included in the supporting tower, Figure 9 is a side elevation of the rotatable supporting structure, the posts of the tower being removed, parts broken away, Figure 10 is an end elevation of the rotatable supporting structure, parts in section, and parts broken away, Figure 11 is a horizontal section taken on line 11—11 of Figure 9, Figure 12 is a plan view of one of the seat carrying wheels and associated elements, parts omitted and parts broken away, Figure 13 is a side elevation of the same, Figure 13a is a diagrammatic view of the apparatus, collapsed, Figure 14 is a side elevation of one of the seat carrying wheels, in the open position, Figure 15 is a vertical longitudinal section taken on line 15—15 of Figure 14, Figure 16 is a side elevation of the seat carrying wheels, collapsed, taken on line 16—16 of Figure 15, Figure 17 is an enlarged side elevation of the hub of the seat carrying wheel, collapsed, taken on line 17—17 of Figure 15, Figure 18 is a side elevation of the lower half of the apparatus collapsed, and, Figure 19 is a similar view of the upper half.

The apparatus comprises a tower 20 including preferably tubular uprights 21 which would ordinarily be from thirty to forty-five feet long. At their lower ends, the uprights 21 are rigidly connected with horizontal base sills 22, at points 23. The base sills include arms 24 and 25, the arms 25 being longer than the arms 24, see Figures 1, 3 and 4. Connected with the arms 24 by hinge joints 26, to break upwardly, are extensions 27, while base extensions 28 are hinged to the arms 25, at 29, to break upwardly. The extensions 27 and 28 are detachably connected with braces 30 by means of pins 31, engaging plates 32, rigidly secured to the base extensions 27 and 28. Inner diagonal braces 33 are also detachably connected with the plates 32 by pins 34. The braces 30 are detachably connected at 35 with horizontal braces 36, detachably connected with plates 37 by pins 37' or other suitable means. The plates 37 are rigidly secured to the uprights 21. The upper ends of the inner braces 33 are also detachably secured to the plates 37. The upper ends of the braces 30 are detachably connected with pins 38, Figures 1, 6 and 8, engaging plates 39, rigidly secured to the upper ends of the uprights 21. It is obvious that these various braces are rigidly connected with the uprights 21 and the base structure, so that the tower cannot swing longitudinally of the base structure and is held in the upright position. The numeral 40 designates base bars, arranged horizontally at right angles to the base structure, and these base bars are detachably connected with the horizontal base sills 22, by means of pins 41, engaging ears 41' rigidly secured to the sills 22. The base bars 40 are horizontal in use and engage the ground or foundation and have plates 42 rigidly secured to their outer ends, and these plates are detachably connected with outer diagonal braces 43 by means of pins 44 and inner diagonal braces 45 by means of pins 46. The outer braces 43 are detachably connected at 47 with horizontal braces 48, which extend inwardly for detachable connection with plates 49 by pins 50. The plates 49 are rigidly secured to the uprights 21. The upper ends of the inner diagonal braces 45 are detachably secured to the pins 50. The upper ends of the outer diagonal braces 43 are detachably connected with plates 51, by means of pins 52, and the plates 51 are rigidly mounted upon the upper ends of the uprights 21, Figure 8. To render the base structure more rigid, the base sills 22 are rigidly connected by a transverse bar 22', Figure 3, disposed adjacent to the uprights 21. The base extensions 27 and 28 are rigidly connected at their outer ends, Figure 5, by cross bars 28', and diagonals 29'. The base bars 40 and associated diagonal braces rigidly hold the tower against swinging movement transversely of the base structure.

A platform section 51' is permanently mounted upon the base sills 22, and a platform section 53 is rigidly secured to the extensions 27, outwardly of the hinges 26. A platform section 54 is rigidly mounted upon the extensions 28 outwardly of the hinges 29. The adjacent ends of the platform sections are spaced at the hinges so that they do not interfere with the folding action of the platform sections, Figures 1, 3, 4 and 13a. The platform sections form a platform for the passengers, the upper face of which is inclined upwardly toward its outer ends and is generally concentric with the path of travel of the rotatable supporting element.

The numeral 56, Figures 1, 7 and 8, designates a horizontal stationary shaft, which is preferably tubular, and which is rigidly attached to the upper ends of the uprights 21. A rotatable supporting structure 57 is rotatably mounted upon the stationary shaft 56. This rotatable supporting structure has its major portion permanently secured to the shaft 56, and these major portions are foldable or collapsible. The rotatable supporting structure includes a pair of radial arms 58, Figure 6, and these arms are rigidly mounted within collars 59. The collars 59 are rigidly rotatably secured to rings 60. The rings 60 are mounted upon the stationary shaft 56 and are provided with ball bearings 60' and are held against longitudinal displacement by shoulders 61. The rings 60 also have sleeves 62 and 63, rigidly secured thereto. Rigidly secured to the rings 60, diametrically opposite the sleeves 59, are pairs of spaced plates 64, and plates 65 are arranged between the pairs of plates 64 and are permanently pivotally connected therewith at their tops, as shown at 66, Figures 1, 6, and 9. The lower ends of the plates 65 are detachably connected with the plates 64 by removable pins 67. When the pins 67 are in place, the plates 65 are rigidly secured to the pairs of plates 64. The plates 65 extend into slots 68, formed in the inner ends of radial arms 69, included in the supporting structure 55 and arranged opposite the arms 58, Figure 1. The plates 65 are welded to the arms 69 within the slots 68. In view of the foregoing description, it will be seen that the arms 69 may be locked in a position extending longitudinally of the arms 58, and by removing the pins 67, the arms 59 may be swung upon the pivots 66 and folded over the arms 58, Figures 1 and 13a.

The numeral 70 designates radial arms which are detachably mounted in the sleeves 62. The numeral 71 designates radial tubular arms, which are removably mounted in the sleeves 63. The sleeves 63 are shorter than the arms 70 and receive extension arms 71, held in place by set screws 73 or the like. The combined length of the extension arms 71 and sleeves 63 is equal to the length of the arms 70. The arms 70 and arm extensions 71 are detachably connected with braces 74, which are also detachably connected with the arms 58 and 69, as shown. Diagonal cables 75 are detachably connected with the arms 70 and the arm extensions 71 and with the outer ends of the arms 58 and 69 by any suitable means. Before the arms 69 are folded over the arms 58, arms 70, arm extensions 71, braces 74 and cables 75 are removed.

As more clearly shown in Figures 6, 9, 10 and 11, the numeral 77 designates a motor supporting frame. This frame includes a bar 77', parallel with the shaft 56, and rigidly mounted upon the sleeves 63, near the shaft 56. The frame includes a second bar 78', arranged opposite the bar 77'. The bar 78' is rigidly connected with transverse bars 79', rigidly mounted upon the sleeves 63. The bars 79' have diagonal braces 80' rigidly secured thereto and rigidly secured to the arms 58 and sleeves 63. A transverse bar 81' connects the bars 78' and 77' and is connected with a bar 82', also connected with the bar 79'. A rigid table top 83' is mounted upon elements 79', 78', 81' and 82'. A motor 78 is arranged beneath the table top 83' and rigidly secured thereto. This motor drives a sprocket wheel 79 through suitable speed reducing gearing 80. The sprocket wheel 79 engages a sprocket chain 81, engaging a larger sprocket wheel 82, rigidly mounted upon a shaft 83, rotatable within bearings 84, mounted upon the sleeves 63. The shaft 83 has a small sprocket wheel 83a rigidly mounted thereon, engaged by a sprocket chain 83b, engaging a large sprocket wheel 83c, which is rigidly mounted upon the stationary shaft 56, and hence held against rotation. It is thus seen that the rotation from the motor is reduced and transmitted to the chain 83b, whereby this chain travels around the stationary sprocket wheel 83c, and bodily rotates the supporting element 57 at a reduced speed, since the motor is mounted upon the sleeves 63 which are a part of the rotatable supporting element.

As more clearly shown in Figures 1 and 15, a transverse shaft 83d is arranged between and rigidly mounted upon the outer ends of each pair of arms 58 and 69, and a sleeve 84d is rotatable upon the shaft 83b. Sprocket wheels 85 are rigidly connected with the ends of each sleeve 84d, to rotate the same, and spacing elements or collars 86 may be employed to prevent longitudinal displacement of the sleeve 84d. Ball bearing units 86' may be provided, as shown. Rigidly mounted upon each pair of arms 58 and 69 are motors 87, drving speed reducing units 88, which drive small sprocket wheels 89, which engage sprocket chains 90, which engage and drive the large sprocket wheels 85. The motors 87 may be equipped with magnetic brake devices 91, adapted to be intermittently operated. When the brake devices are energized, they are rendered active and serve to hold the armature shafts in the motors against rotation. The brake devices may be rendered active by the closing of a circuit by pressing a button and the brake devices will then apply the brakes to the armature shafts of the motors, which effect a gradual stopping of the rotation of the sleeves 84d, and then holds these sleeves against rotation until the brake devices are de-energized. When the motors are energized, the brake devices are de-energized.

A wheel 92 is mounted upon each sleeve 84d, Figures 1, 12, 13 and 14 to 17 inclusive. Each wheel 92 is permanently secured to its sleeve 84d and is collapsible thereon. Rigidly mounted upon the sleeve 84 are pairs of discs 93, see more particularly Figures 12 and 15. Each wheel comprises pairs of radial arms 94 and 95. The arms 94 are rigidly secured to the discs 93 by pairs of bolts 96 and these arms are oppositely arranged. The other radial arms 95 also project between the pairs of discs 93 and are pivoted thereto at 97. The arms 94 and 95 are connected by removable circumferentially extending braces 98, detachably connected therewith. The arms 94 and 95 extend radially outwardly beyond the braces 98 and carry passenger seats 99, which are pivotally and detachably connected therewith. These seats remain in the vertical position, in use.

Rigidly secured to the sleeves or arms 63 are brackets 100, upon which are mounted rollers or wheels 101, extending radially beyond the arms 63.

Each wheel 92 is collapsed, when the apparatus is transported, and the passenger seats are first removed and the circumferentially extending braces 98 are removed. The pivoted arms 95 are then folded close to the fixed arms 94, Figures 14 and 16, and are held in this position by straps 95' temporarily connected therewith.

In Figure 13a, the apparatus is collapsed for the purpose of shipment, the various diagonals or braces being removed. The uprights 21 are folded to the horizontal position, and the base structure folded, and the base extensions 27 and 28 are horizontal while the base sills 22 are vertical. The arms 58 have been moved between the horizontal uprights 21 and supported by any suitable means. The arms 69 are folded over the arms 58 and are generally parallel therewith and supported by any suitable means. The wheels 92 carried by the arms 58 and 69 having been collapsed, the collapsed wheels and the arms are arranged in generally parallel superposed relation. The extensions 28 and platform section 54 are folded over the collapsed wheels. In this collapsed condition, the forward end of the collapsed structure may be supported by the wheels 101. These wheels aid in moving the collapsed structure so that it may be placed upon a truck for transportation.

Before collapsing the tower, the diagonals 30, 33, 43 and associated elements are removed. Before collapsing the rotatable supporting structure, the arms 70, extensions 71, elements 74 and 75, are removed.

To erect the apparatus, the base extensions 27 are horizontally arranged upon the ground, while the base sills 22 are vertical, and the base extensions 28 are then swung to the vertical position. The arms 69 are next swung to the open position and locked in this position by locking the plate 65 to the plate 64 by means of the pins 67. The diagonal braces 30, 33 and 36 are now placed in position for forming a stiff connection between the uprights 21 and the base extensions 28, the corresponding diagonals leading to the extensions 27 and not as yet placed in position. A cable is now passed over the top of the vertically arranged platform section 54 and attached to the upper ends of the uprights 21, and the cable is pulled to swing the uprights to the vertical position, the base sills 22 turning upon the pivots 26 until they become horizontal. When the uprights 21 become vertical, the other braces 30, 33 and 36 are put in place, and the base bars 40 and braces 43, 45 and 48 are put in position. The supporting element 57 may now be turned to bring one seat carrying wheel to the lowered position. The arms 94 and 95 are now separated and the braces 98 placed in position to hold these arms radial. The cables 75 and elements 70, 71 and 74 are preferably placed in position after the arms 69 are shifted to the open position and remain horizontal. The several seats 99 are now attached to the arms 94 and 95 of each wheel. The supporting structure is turned around and the other wheel is expanded and treated in the same manner.

In use, the supporting structure 57 is rotated by the motor 78 and the supporting structure is turned at a suitably slow speed, and may be stopped and started at will. The motor 78 may be equipped with a suitable electrode magnetic brake. Each wheel 92 is independently rotated by its two motors 87, and each wheel may be started and stopped as desired. The wheels rotate upon their axes while the supporting structure 57 is rotating about its axis. To discharge or take on passengers, the supporting structure is stopped with either wheel in the lower position, and the passengers standing upon the platform or base may readily enter the seat or seats 99 or leave such seat or seats and alight upon the platform.

It is to be understood that the form of my invention herewith shown and described is to be taken as a preferred example of the same and that various changes in the shape, size and arrangement of parts may be resorted to, without departing from the spirit of my invention or the scope of the subjoined claim.

Having thus described my invention, I claim:

An amusement apparatus comprising, a base including an intermediate base section of substantial length and end base sections which are longer than the intermediate base section, means pivotally connecting the inner ends of the end base sections with the outer ends of the intermediatae base section, the intermediate base section being adapted to be substantially vertically arranged and the end base sections substantially horizontally arranged in superposed relation when the base is folded, a supporting structure including spaced uprights rigidly secured to the intermediate base section and to be swung to the vertical position when the intermediate base section is swung to the horizontal position, a shaft secured to the free ends of said uprights, a supporting element, means to rotatably mount the supporting element upon the shaft between said uprights, said supporting element including arm units which are connected with said shaft and foldable upon each other adjacent to said shaft, collapsible wheels carried by the foldable arm units, passenger supporting elements carried by the wheels, means to rotate the supporting element, and means to rotate said wheels, the arrangement being such that the collapsed wheels may be arranged to extend longitudinally of the arm units and the length of the intermediate base section being such that when the arm units and the collapsed wheels carried thereby are arranged in collapsed superposed relation they may be arranged between the end base sections which are then disposed in superposed generally horizontal relation.

References Cited in the file of this patent

UNITED STATES PATENTS

| | | |
|---|---|---|
| 669,621 | Conderman | Mar. 12, 1901 |
| 2,249,076 | Courtney | July 15, 1941 |
| 2,437,000 | McBride | Mar. 2, 1948 |
| 2,590,934 | Catlett | Apr. 1, 1952 |